United States Patent [19]
Kovanov et al.

[11] 3,952,667
[45] Apr. 27, 1976

[54] PNEUMATIC LOAD TRANSPORTATION SYSTEM

[76] Inventors: Pavel Vasilievich Kovanov, B.Bronnaya, 19-21, kv. 23; Adolf Moritsovich Alexandrov, Federativny prospekt, 6, korpus 3, kv. 8; Jury Abramovich Tsimbler, Sojuzny prospekt, 10, kv. 261; Vladimir Efimovich Aglitsky, Zatsepsky val, 6/13, kv. 61, all of Moscow, U.S.S.R.

[22] Filed: Apr. 28, 1975

[21] Appl. No.: 572,164

[30] Foreign Application Priority Data
May 14, 1974 U.S.S.R............................ 2023614

[52] U.S. Cl............................ 104/138 R; 104/155; 243/32; 243/38; 243/39; 308/5 R
[51] Int. Cl.² .................. B65G 51/04; F16C 33/10
[58] Field of Search................ 104/138 R, 155, 156, 104/134; 243/1, 3, 4, 32, 33, 34, 35, 38, 39, 2, 16 R, 17, 18; 308/5 R, 5 V

[56] References Cited
UNITED STATES PATENTS

| 1,053,368 | 2/1913 | Eells | 104/155 |
| 1,183,198 | 5/1913 | Hills | 243/32 |
| 1,411,597 | 4/1922 | Trask | 104/134 |
| 2,511,979 | 6/1950 | Goddard | 104/138 R |
| 3,225,228 | 12/1965 | Roshala | 104/134 X |

Primary Examiner—Evon C. Blunk
Assistant Examiner—James L. Rowland
Attorney, Agent, or Firm—Lackenbach, Lilling & Siegel

[57] ABSTRACT

A system comprising receiving and dispatching stations interconnected by a pipeline having a guide fixed to the inner side wall thereof, and by containers moving along this pipeline, each container having a leading seal mounted at the forward end side thereof in the direction of movement of the containers, a trailing seal mounted at the rear end side thereof in the direction of movement of the containers, the leading seal closing the lower half of the space between the container and the pipeline and the trailing seal closing the upper half of this space, and stiff longitudinally extending lateral seals supported by said guides in the pipelines and serving as bearing supports for sliding of the container.

This construction of the pipeline and containers reduces the wear of the longitudinally extending lateral seals and lowers the power consumption for transportation of the container.

9 Claims, 11 Drawing Figures

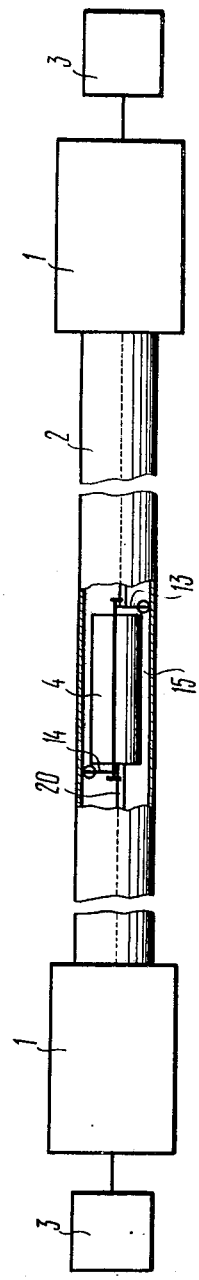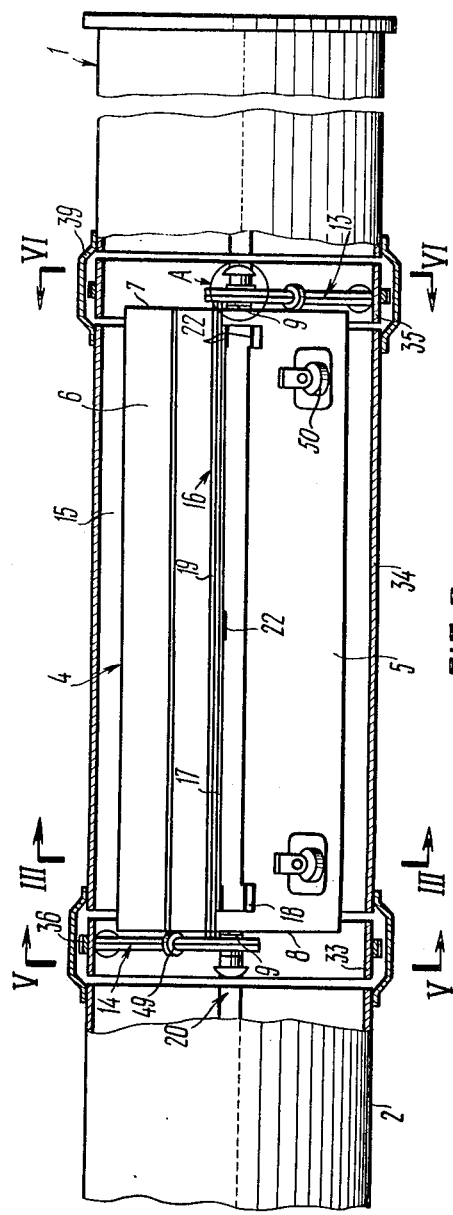

PNEUMATIC LOAD TRANSPORTATION SYSTEM

The present invention relates to pneumatic load transportation systems for transporting cargo in containers along a pipeline having a diameter of about 1 mm and greater.

Known in the art are pneumatic load transportation systems for transporting cargo in containers along a pipeline comprising receiving and dispatching stations interconnected by a pipeline along which the containers are transported under the action of a pressure difference. Each container is provided with a leading seal and a trailing seal mounted at the end sides thereof. The leading seal closes the lower half of the space between the container and the pipeline. The trailing seal closes the upper half of the space between the container and the pipeline. Said leading and trailing seals, in combination close the entire cross-section of the pipeline.

Longitudinally extending lateral seals are mounted on the lateral sides of the container between said leading and trailing seals, and the lateral seals are connected to the end seals.

The longitudinally extending lateral seals close the space between the lateral sides of the container and the side walls of the pipeline.

Due to the provision of the leading, trailing and lateral seals, the container moves along the pipeline on an "air cushion".

The longitudinally extending lateral seals comprise flat sheets having rubber sealing members at the ends thereof. These seals are in proximate contact with the pipeline walls so that during the operation of the container they are rapidly worn out, thus resulting in an increased power consumption for moving the container due to the increased air leakage through the resulting space and to the partial or complete disappearance of the "air cushion" effect.

Furthermore, the supports transmitting the weight of the container to the pipeline walls comprise wheels mounted on the walls of the container so that the construction of the container is rather complicated.

It is an object of the invention to provide a pneumatic load transportation system, wherein the container and pipeline have such a construction as to reduce the wear of longitudinally extending lateral seals and to lower the power consumption for transportation of the container due to a better utilization of the "air cushion" effect.

In accordance with these and other objects there is contemplated a pneumatic load transportaion system comprising receiving and dispatching stations interconnected by a pipeline and containers transported therealong, each container having a leading seal and a trailing seal mounted at the end sides thereof, the leading seal closing the lower half of the space between the container and the pipeline and the trailing seal closing the upper half of this space, as well as longitudinally extending lateral seals arranged substantially in a diametrical plane between said leading and trailing seals according to the invention, there are provided guides rigidly fixed opposite to each other to the inner lateral wall of the pipeline substantially in a diametrical plane. The longitudinally extending lateral seals are made stiff and are supported on the guides and, thus, serve as supports for sliding of the container, the leading and trailing seals having through slots for the passage of said guides.

Each guide preferably is of a rectangular cross-section and each longitudinally extending lateral seal comprises a channel member having its wings embrace the guide with a predetermined spacing.

This construction of the longitudinally extending lateral seal and guide represents the simplest solution permitting restriction of the displacement of the container relative to the guides in vertical and horizontal planes.

The surfaces of the longitudinally extending lateral seal supported on the guide are preferably covered with a layer of an antifriction composition.

The provision of a layer of an antifriction composition on the surfaces of the longitudinally extending lateral seal permits the reduction of the coefficient of friction between these surfaces and the guide.

Valves are preferably provided on each guide, the valves being spaced along the guide and communicating with a source of a lubricant for so as to ensure the application and feeding of a lubricant to the surface of the longitudinally extending seal and to the guide in contact therewith whereby the coefficient of friction between said contacting surfaces is additionally reduced.

The guide is preferably made hollow so as to define a closed space in combination with the pipeline wall, the valves communicating with a source of a lubricant through this space.

This construction of the guides makes it possible to provide a supply of liquid lubricant to the contacting surfaces in a simple and inexpensive manner.

The portions of the pipeline at the receiving and dispatching stations having the guides fixed thereto at the points of location of the leading and trailing seals of the container upon the stoppage thereof are preferably made rotatable for rotation of said seals embracing the guides with their slots at 180° to reverse the direction of movement of the container.

The provision of guides in a pneumatic load transportation system according to the invention, as well as of the stiff longitudinally extending lateral seals, substantially diminishes the wear of the seals and to improves their reliability in operation of the container.

In addition, the invention improves the efficiency of the "air cushion" and considerably reduces the power consumption for transportation of the container.

The invention will now be described with reference to specific embodiments thereof illustrated in accompanying drawings, in which:

FIG. 1 shows a general view partially in section of a pneumatic load transportation system;

FIG. 2 shows a container located in a receiving and dispatching station;

A pneumatic load transportation system comprises receiving and dispatching stations 1 (FIG. 1) interconnected by a pipeline 2 made of pipes of a large diameter (about 1 m and greater). Each receiving and dispatching station 1 communicates with a compressed air source 3. Containers 4 are moved along the pipeline under the action of an air pressure difference.

Figure 5:
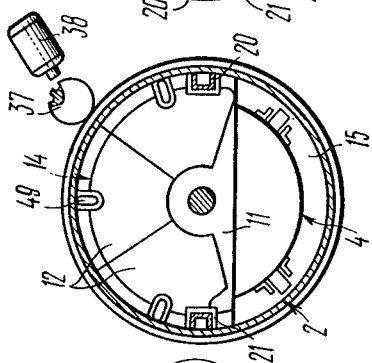
FIG. 5 is a sectional view taken along the line V—V in FIG. 2 (a casing not shown)
Figure 3:
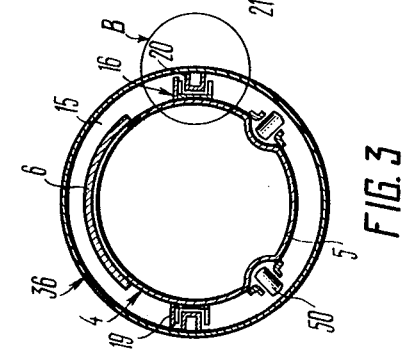
FIG. 3 is a sectional view taken along the line III—III in FIG. 2.
Figure 4:
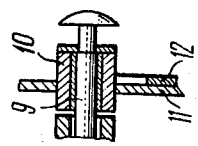
FIG. 4 is an enlarged sectional view of detail A in FIG. 2.

Each container 4 has a cargo receptacle 5 (FIGS. 2, 3) covered with a cover 6. To the end sides 7, 8 of the receptacle 5 there are fixed journals 9 (FIGS. 4, 5, 6).

A bushing 10 (FIG. 4) with a plate 11, to which there are fixed segments 12, is mounted on each journal 9.

Figure 6:
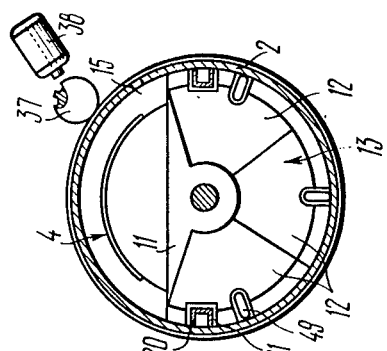
FIG. 6 is a sectional view taken along the line VI—VI in FIG. 2 (a casing not shown)

The segments 12 fixed to the plate 11 of the journal 9 at the end side 7 form a leading seal 13 (FIGS. 2, 6). The segments 12 (FIGS. 4, 5) fixed to the plate 11 of the journal 9 at the end side 8 form a trailing seal 14 (FIGS. 2, 5).

The leading seal 13 closes the lower half of the space 15 (FIG. 1) formed between the receptacle 5 (FIGS. 2, 6) of the container 4 and the inner surface of the pipeline 2 and the trailing seal 14 closes the upper half of said space.

Longitudinally extending lateral seals 16 (FIGS. 2, 3) having a required stiffness and strength are fixed to opposite lateral sides of the receptacle 5 of the container 4 substantially in a diametrical plane, each seal comprising a channel member whose wings 17 and 18 face the pipeline 2.

The upper wing 17 is solid, and the lower wing 18 has a longitudinal slot so as to reduce the weight of the container 4.

In order to increase the stiffness of the seal 16, a plate 19 is fixed to the upper wing 17 which interconnects the leading seal 13 and the trailing seal 14.

Guides 20 supporting the longitudinally extending lateral seals 16 are rigidly fixed to the inner lateral wall of the pipeline 2 along the entire length thereof opposite to each other and substantially in a diametrical plane.

The guides 20 are of a rectangular cross-section. Each longitudinally extending seal 16 embraces the respective guide 20 with a predetermined spacing which depends on dimensional inaccuracies and deviations from geometrical shape of the containers 4 and the pipeline 2 which are to be compensated for, and each longitudinally extending seal constitutes the bearing support of the container 4.

At the points of location of the guides 20 the leading seal 13 and the trailing seal 14 are provided with slots 21 (FIGS. 5, 6) for the passage of the guides.

The surfaces of each longitudinally extending lateral seal 16, which can come into contact with the guides 20 during the starting, acceleration, movement and stoppage of the container, are covered with a layer 22 of an antifriction composition, such as an antifriction plastic or any other appropriate material.

Figure 7:
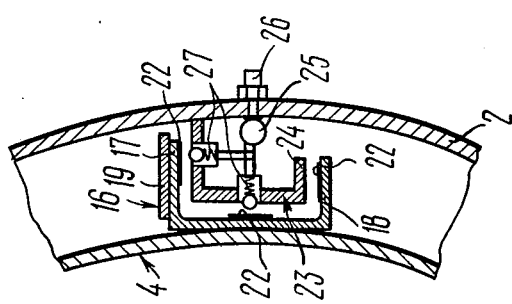
FIG. 7 is an embodiment of the guide.

In one of the embodiments, the guide 23 (FIG. 7) comprises a channel member having its wings facing the lateral wall of the pipeline 2.

The lower wing 24 of the guide 23 is made shorter and does not adjoin the wall of the pipeline 2. This guide is fixed to the wall of the pipeline 2 by welding its upper wing thereto. The spacing between the wing 24 and the wall of the pipeline 2 is intended for facilitating the operations of assembly of a pipe 25 extending along the pipeline 2. This pipe is connected, via a pipe connection 26 mounted in the wall of the pipeline 2, to a source of a lubricant (not shown).

In order to provide for a better sliding of the longitudinally extending lateral seal 16 along the guide 23 at the contact therebetween ball valves 27 are spaced along the entire length of the guide so as to ensure lubrication along the entire surface of contact thereof with the seal 16.

Any appropriate valves may be used for that purpose.

In accordance with another embodiment, the guide 28 (FIG. 8) comprises a channel member having its wings facing the lateral wall of the pipeline 2 and welded thereto. This guide defines, in combination with the wall of the pipeline 2, a closed space 29 communicating, via a pipe connection 26, with a source of a lubricant (not shown) for filling this space with oil.

The ball valves 27 are mounted along the guide 28 and communicate with the space 29.

If the pipeline 2 is made of reinforced concrete or other building materials, such as a pipeline 30 (FIG. 9) having a rectangular cross-section, the guide 28 with the valves 27 is preferably connected to the wall of the pipeline 30 by means of a plate 31 welded to the channel wings, and bolts 32.

In order to reverse the direction of movement of the container 4, the pipeline is made composite of adjoining portions 33, 34, 35 at the receiving and dispatching station 1 (FIG. 2).

The guides similar to the guides 20 described above are fixed to the lateral walls of each of these portions substantially in a diametrical plane.

Upon the stoppage of the container 4, its receptacle 5 is located in the portion 34, and the leading and trailing seals 13 and 14 thereof are accommodated in the portions 35 and 33, respectively, the seals embracing with their slots 21 (FIGS. 5, 6) the respective guides 20 of these portions.

A gear rim 36 fixed to the external side of each portion 33 (FIG. 2) and 35 meshes with a pinion 37 which is in a force transmitting connection with a motor 38.

The force transmitting connection may be of any appropriate type and is not shown in the drawing for the sake of clarity.

Upon rotation of the portions 33 and 35, the leading seal 13 and the trailing seal 14 are rotated at 180° and the container 4 is ready to move in the opposite direction.

Figure 10:
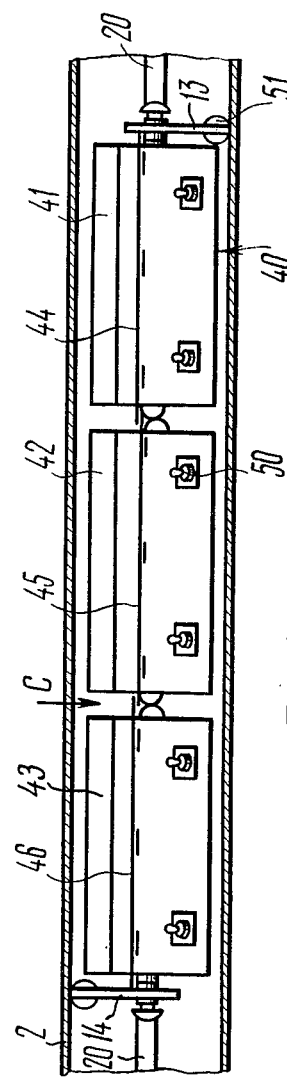
FIG. 10 shows a train of containers in the pipeline.

Each rotatable portion 33 and 35 with the gear rim 36 fixed thereto is covered with a casing 39.

Where a train 40 (FIG. 10) of containers 41, 42 and 43 connected to each other is transported along the pipeline, the leading seal 13 is mounted at the forward end of the leading container 41, and the trailing seal 14 is mounted in the rear end of the tail container 43.

The leading and trailing seals used for the train 40 are similar in structure to the leading and trailing seals mounted on the container 4.

The longitudinally extending lateral seals 44, 45 and 46 of the containers 41, 42 and 43, respectively, of the train 40 are mainly similar to the longitudinally extending lateral seals 16 of the container 4.

Figure 11:
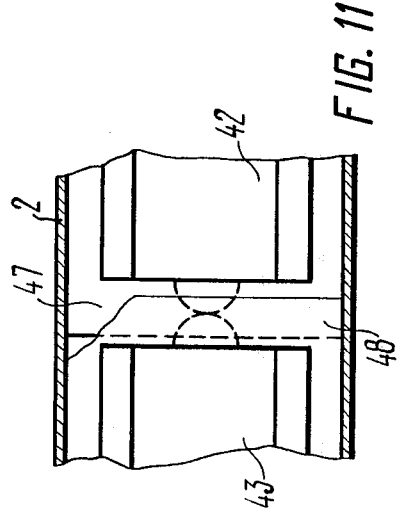
FIG. 11 is an enlarged view taken along the arrow C in FIG. 10.

The seal 44 is connected to the leading seal 13 and the seal 46 is connected to the trailing seal 14. The longitudinally extending lateral seal 45 is provided, at the end sides of the receptacle 5 of the container 42, with a bridge member 47 (FIGS. 10, 11) which is formed by the plate 19 overlapping similar plates 48 of the containers 43 and 41.

The bridges 47 and 48, in combination with the seals 44, 45 and 46, provide for relative sealing of the upper and lower halves of the space 15 between the receptacles 5 of the containers 41, 42 and 43 and the inner surface of the pipeline 2.

The pneumatic load transportation system functions as follows.

Figure 9:
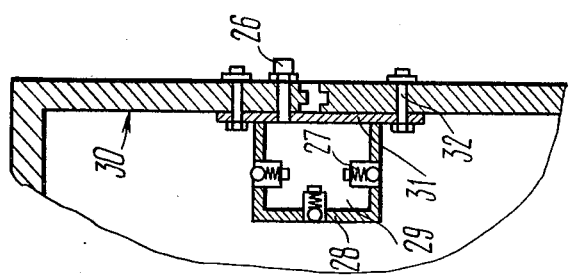
FIG. 9 is a third embodiment of the guide.
Figure 8:
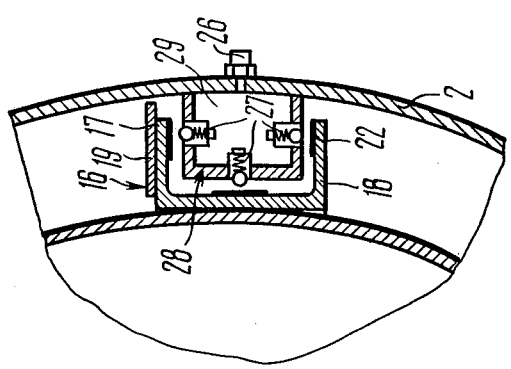
FIG. 8 is another embodiment of the guide.

Prior to starting, the container 4 (FIG. 1) or the train 40 (FIG. 10) at the receiving and dispatching station 1 is supported, with the wings 17 (FIGS. 2, 7, 8) of the channel members of the longitudinally extending seals 16 or longitudinally extending lateral seals 44, 45, 46 (FIG. 10), on the upper planes of the guides 20 (FIG. 3), 23 (FIG. 7) or 28 (FIGS. 8, 9).

Compressed air is supplied from the source 3 (FIG. 1) to the receiving and dispatching station 1, that is into the space beneath the container 4 or train 40. The space beneath the container 4 is defined by the seal 13 (FIG. 2) closing the lower half of the space 15 between the receptacle 5 and the inner surface of the pipeline 2 and by the lateral seals 16 closing the longitudinal spaces 15 between the lateral walls of the receptacle 5 and the inner surface of the pipeline 2. The space is isolated from the space above the container 4 by means of the trailing seal 14 closing the upper half of the space 15 between the receptacle 5 and the inner surface of the pipeline 2.

The space beneath the train 40 (FIG. 10) is defined by the leading seal 13 closing the lower half of the space 15 between the receptacle of the container 41 and the inner surface of the pipeline 2; lateral longitudinally extending seals 44, 45, 46 closing the longitudinal space 15 between the receptacles of the containers 41, 42 and 43, respectively, and the inner surface of the pipeline 2; and the bridges 47, 48 closing the spaces between the containers 41, 42 and 43, and the space so defined is isolated from the space above the train 40 by means of the trailing seal 14 closing the upper half of the space 15 between the receptacle of the container 43 and the inner surface of the pipeline 2.

Upon supply of compressed air, the container 4 (or the train 40) starts moving due to a pressure difference at the seals 13 and 14, and a lift force is developed due to a pressure difference at the seals 16 (or at the seals 44, 45, 46 and bridges 47 and 48). An air space is formed between the wings 17 of the channel members of the longitudinally extending lateral seals 16 (or 44, 45, 46) and the upper sides of any of the guides 20, 23 and 28, and the container 4 (or the train 40) is caused to move along the pipeline 2 in a predetermined direction on an "air cushion".

During the movement of the container 4 (or train 40) the lift of the container (or train) is self-controlled by the amount of said air space, an increase in the lift force increases the space thus resulting in an increased air flow through this space and a reduced pressure difference decreases the lift force and reduces the space.

The lower wings 18 of the channel members of the longitudinally extending lateral seals 16 of the container 4 (or longitudinally extending lateral seals 44, 45 and 46 of the train 40) restrict the lift of the container 4 (or train 40) upon the engagement with any of the guides 20, 23 or 28.

In order to limit the lateral displacement of the container (or train) vertical side surfaces of the guides 20, 23 or 28 and vertical sides surfaces of the longitudinally extending lateral seals 16 are used.

During the starting, acceleration, movement or deceleration of the container 4 (or train 40), with the direct contact between the wings 17, 18 and the vertical side surfaces of the channel members of the longitudinally extending lateral seals 16 of the container 4 (or longitudinally extending lateral seals 44, 45, 46 of the train 40) and the respective outer surfaces of the guides 20, 23 or 28, a lubricant is fed through the ball valves 27 from the pipe 25 (or from the space 29) to said contacting surfaces from a source of a lubricant (not shown), via the pipe connection 26. The consumption of a lubricant is rather small.

Each segment 12 of the leading seal 13 and the trailing seal 14 has a roller 49 loaded by a spring (not shown). Thus, during the movement of the container 4 (or train 40) the cross-sectional shape of the pipeline 2 is strictly followed so that, independently of deviations from the nominal dimensions of the pipeline and dimensional instability of the pipeline, the space between the seals 13 and 14 and the inner surface of the pipeline 2 remains constant, and the wear of the segments 12 of the seals 13 and 14 is substantially eliminated.

The longitudinally extending lateral seals 16 of the container 4 (or the seals 44, 45, 46 of the train 40) used as the longitudinal bearing supports of the container (or train) are substantially not subjected to wear during the movement of the container 4 so that the reliability of the container is improved and the conditions are provided for its stable movement along the pipeline on an "air cushion", which, in its turn, permits to considerably lower the power consumption for transportation of the container 4 (or train 40).

After passing through the pipeline 2, the container 4 (or the pipeline 40) enters another receiving and dispatching station 1, is decelerated thereat by means of a deceleration device (not shown) and positioned by means of the same device in such a manner that the receptacle 5 thereof (or the containers 41, 42, 43 of the train 40) is accommodated at the portion 34 of the pipeline 2, and the leading and trailing seals 13 and 14 are located in the portions 35 and 33, respectively.

After the loading (unloading) operations are completed, the motor 38, the force transmitting connection (not shown) which couple the motor 38 to the pinion 37, as well as the gear rim 36 cause the rotation of the portions 33 and 35 of the pipeline 2 at 180°.

The leading and trailing seals 13 and 14 whose slots 21 embrace the guides 20 of these portions are also rotated together therewith at 180°. Thus, the leading seal 13 takes the upper position to perform the functions of the trailing seal, and the trailing seal 14 takes the lower position to perform the functions of the leading seal.

Air is fed from the compressed air source 3 to the receiving and dispatching station, and the container 4 is caused to move in the opposite direction along the pipeline 2.

Thus, the container 4 moves in the opposite direction without having been turned in a horizontal plane at the receiving and dispatching station which would require a larger area and a cost increase.

When a repair is required, in order to allow the withdrawal of the container 4 (or the train 40) into open repair and assembly troughs (not shown), rollers 50 are provided at the underside of the container 4 or containers 41, 42 and 43 (FIGS. 2, 3, 10), these rollers taking no part in the operation when the container 4 or train 40 moves along the pipeline 2.

What is claimed is:

1. A pneumatic load transportation system comprising: receiving and dispatching stations; a pipeline interconnecting said receiving and dispatching stations; guides rigidly fixed opposite to each other to the inner side walls of said pipeline substantially in a diametrical plane along the entire length thereof; containers in said pipeline; an annular space between each of said containers and said pipeline; a leading seal mounted on each container at the forward end side thereof in the direction of movement of said containers, said seal closing the lower half of said annular space; a trailing seal mounted on each container at the rear end side thereof in the direction of movement of said containers, said seal closing the upper half of said annular space; through slots in said leading and trailing seals for the passage of said guides; longitudinally extending lateral seals which are made stiff and fixed to the opposite lateral sides of each of said containers substantially in a diametrical plane between said leading and trailing seals; said longitudinally extending lateral seals of each of said containers being supported by said guides and serving as bearing supports for sliding of said containers; a source providing a flow of gas in said pipeline for moving said containers therealong.

2. A system according to claim 1, wherein each guide is of a rectangular cross-section, and each longitudinally extending lateral seal comprises a channel member having its wings embracing said guide with a predetermined spacing.

3. A system according to claim 2, wherein the surfaces of the longitudinally extending lateral seal supported by the guide are covered with a layer of an antifriction composition.

4. A system according to claim 2, wherein valves are spaced along each guide, said valves communicating with a source of a lubricant for supplying a lubricant to the contacting surfaces of the longitudinally extending lateral seal and the guide.

5. A system according to claim 1, wherein the surfaces of the longitudinally extending lateral seal supported by the guide are covered with a layer of an antifriction composition.

6. A system according to claim 5, wherein valves are spaced along each guide, said valves communicating with a source of a lubricant for supplying a lubricant to the contacting surfaces of the longitudinally extending lateral seal and the guide.

7. A system according to claim 1, wherein valves are spaced along each guide, said valves communicating with a source of a lubricant for supplying a lubricant to the contacting surfaces of the longitudinally extending lateral seal and the guide.

8. A system according to claim 7, wherein each guide is made hollow and defines, in combination with the wall of the pipeline, a closed space, said valves communicating with a source of a lubricant through this space.

9. A system according to claim 1, wherein the portions of the pipeline at the receiving and dispatching stations having guides fixed thereto at the points of location of said leading and trailing seals of the container upon the stoppage thereof are made rotatable for rotation at 180° of said seals embracing with their slots said guides to reverse the direction of movement of said container.

* * * * *